United States Patent [19]

Ford

[11] Patent Number: 5,016,271

[45] Date of Patent: May 14, 1991

[54] ECHO CANCELER-SUPPRESSOR SPEAKERPHONE

[75] Inventor: William A. Ford, Farmingdale, N.J.

[73] Assignee: AT&T Bell Laboratories, Murray Hill, N.J.

[21] Appl. No.: 358,030

[22] Filed: May 30, 1989

[51] Int. Cl.⁵ .............................................. H04M 9/08
[52] U.S. Cl. ..................................... 379/410; 379/388
[58] Field of Search ............... 379/388, 389, 390, 410, 379/406, 411, 409; 370/32.1

[56] References Cited

U.S. PATENT DOCUMENTS

| | | | |
|---|---|---|---|
| 4,360,712 | 11/1982 | Horna | 379/410 |
| 4,513,177 | 4/1985 | Nishino et al. | 379/389 |
| 4,679,230 | 7/1987 | Lassaux et al. | 379/411 |

FOREIGN PATENT DOCUMENTS

| | | | |
|---|---|---|---|
| 0142641 | 8/1983 | Japan | 379/410 |
| 0167128 | 9/1984 | Japan | 370/32.1 |

Primary Examiner—James L. Dwyer
Assistant Examiner—M. Shehata
Attorney, Agent, or Firm—Samuel R. Williamson

[57] ABSTRACT

An echo canceler-suppressor speakerphone arrangement effectively addresses the limitations of regeneration and reverberant return echo inherent in the design of speakerphones. The tendency for regeneration is eliminated by employing adaptive echo cancellation in the receive path of the speakerphone arrangement to cancel speakerphone talker echo across a hybrid and thereby reduce the local loop gain to below unity. And the generation of a reverberant return echo to the far-end party is avoided by employing adaptive echo suppression in the transmit path of the speakerphone arrangement. Near-full and full duplex operation are regularly achieved since the receive path remains open at all times and the transmit path has its gain reduced only to the level necessary to suppress excessive reverberant return echo.

13 Claims, 3 Drawing Sheets

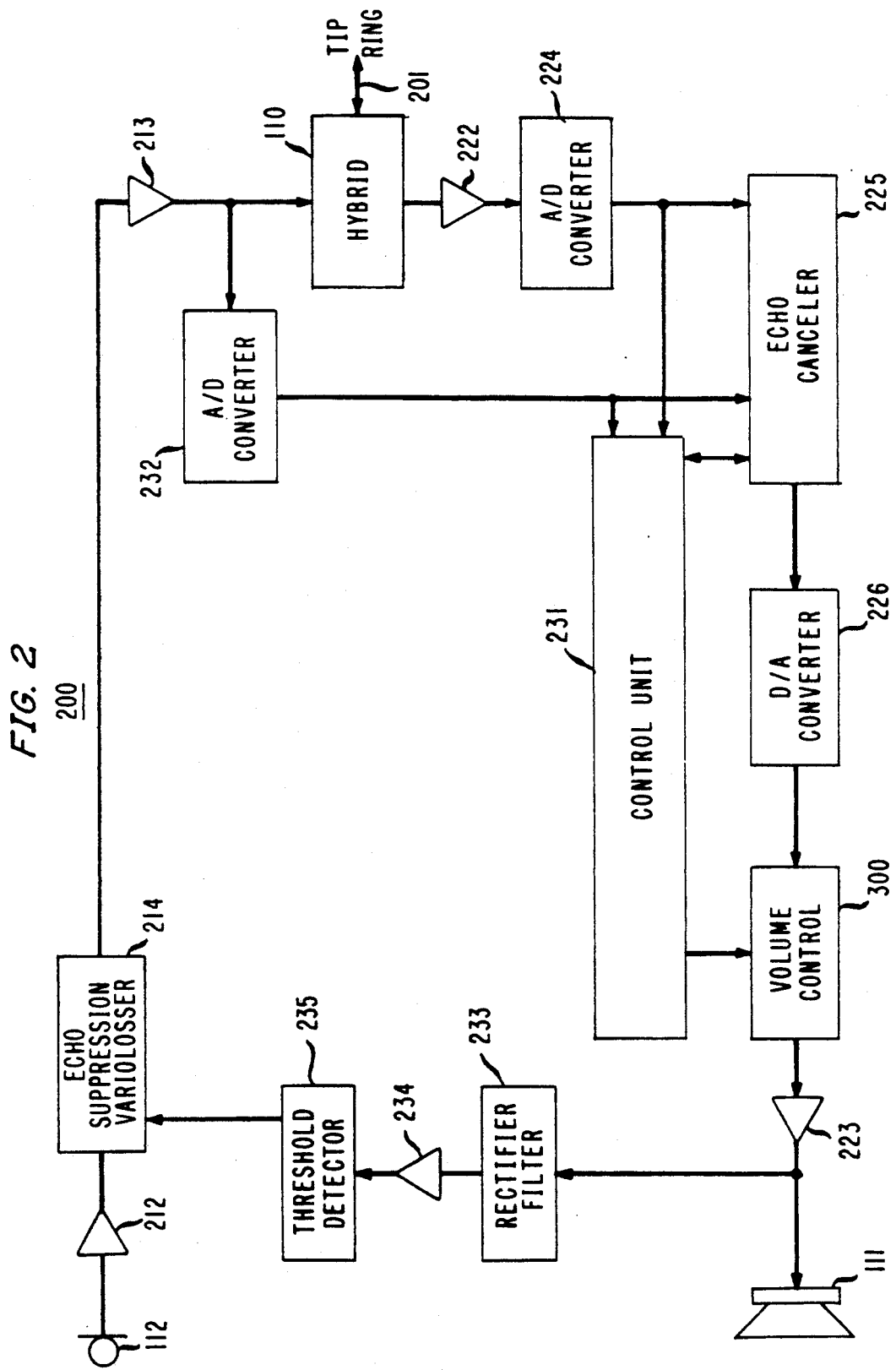

ECHO CANCELER-SUPPRESSOR SPEAKERPHONE

BACKGROUND OF THE INVENTION

1. Technical Field

This invention relates to audio systems and, more particularly, to speakerphone circuits which connect to an audio line for providing two-way voice communications.

2. Description of the Prior Art

The use of analog speakerphones have been the primary hands free means of communicating during a telephone conversation for a great number of years. This convenient service has been obtained at the price of some limitations, however.

There are two basic limitations that must be addressed in the design of analog as well as other speakerphones: a tendency for self oscillation or regeneration and the generation of a reverberant return echo to a far-end talker. Both limitations are present because of the high gain needed in both an outgoing or transmit channel and an incoming or receive channel of a speakerphone for acceptable hands free operation. The signal in the transmit channel must be amplified from a microphone associated with the speakerphone to a level high enough to comply with predefined telephone transmit specifications over a telephone's tip-ring connection. And the signal in the receive channel must be amplified from the tip-ring connection to a power level high enough to drive a loudspeaker also associated with the speakerphone. Undesirable coupling between these channels is provided by both a two-wire to four-wire hybrid coupling path and the loudspeaker-to-microphone acoustic coupling path which respectively comprise the electrical and acoustical portions of a local closed loop. This loop will typically have a gain much greater than unity and self oscillation will occur when uncompensated.

Because of the proximity of the loudspeaker to the microphone in most speakerphone arrangements, the speech level at the microphone resulting from speech at the loudspeaker is typically much greater than that produced by the speakerphone user or near-end party. This causes the far-end party's speech emanating from the loudspeaker to be coupled into the microphone and back through the telephone line to the far-end party. The result is a loud and reverberant return echo heard by the far-end party.

Historically, these limitations have been addressed in the design of conventional analog speakerphones. The operation of conventional analog speakerphones is well known and is described in an article by A. Busala, "Fundamental Considerations in the Design of a Voice-Switched Speakerphone," Bell System Technical Journal, Vol. 39, No. 2, March 1960, pp 265-294. Analog speakerphones generally use a switched-loss technique through which the energy of the voice signals in both the transmit and the receive channels are sensed and a switching decision made based upon that information. The voice signal having the highest energy level in either channel will be given a clear talking path and the voice signal in the other channel will be attenuated by having loss switched into its talking path. If voice signals are not present in either the transmit channel or the receive channel, the speakerphone typically goes to an "at rest" mode in which loss is switched into the transmit channel, the receive channel or both channels. The amount of voice switched loss inserted into each talking path by variable loss elements is determined by the margin necessary to guard against local loop self oscillation and is typically set by the position of the speakerphone volume control.

Far-end reverberant return echo is not normally a limitation in the operation of conventional analog speakerphones since more loss is switched into the transmit channel during the reception of receive speech to avoid self oscillation than is necessary to satisfactorily attenuate the return echo. Although these conventional analog speakerphones effectively address the two basic limitations, in so doing they inherently introduce others: noise induced false switching; transmit and/or receive lock-out caused by background conversations or intermittent noise; and initial clipping of syllables. Full duplex or "double talking" is also not possible with these speakerphones since voice switched loss is always inserted into one or the other of the two channels. In recent more sophisticated voice switched speakerphones, which under certain limited ideal electrical and acoustical conditions may operate in a near-full to full duplex mode, this return echo appears as a limitation and has to be addressed in the design of these speakerphones.

Another approach for addressing the basic limitations inherent in speakerphone design is through employing echo cancelers therein. In operation, an echo canceler continuously estimates an impulse response between the speakerphone's loudspeaker and microphone and subtracts an echo estimate from the return path. The theory of operation of echo cancelers and their use in reducing the effects of echoes and acoustic coupling between loudspeakers and microphones in close proximity is described in detail in a number of references. A few of these are: R. Ceruti and F. Pira, "Application of Echo-Canceling Techniques to Audioconference," Proc. of IEEE International Conference on Acoustics, Speech, and Signal Processing, March 1982; O. Horna, "Cancellation of Acoustic Feedback,"*COMSAT Technical Review*, Vol. 12, Fall 1982. pp. 319-333; Y. Itoh, U. Maruyama, N. Furuya, and T. Araseki, "An Acoustic Echo Canceler for Teleconference," Proc. of IEEE International Communications Conference, June 1985. pp. 46.6.1–46.6.5; and B. Widrow, S. D. Stearns, *Adaptive Signal Processing*, Prentice-Hall, 1985.

The adaptive filtering techniques of echo cancelers is thus known and has been employed in the transmit and receive channels in an echo canceling speakerphone. Through this approach, local loop loss can be effectively added to both the hybrid and acoustic coupling paths. The time span for the impulse response across the hybrid is typically on the order of 4 milliseconds and this echo may be canceled with a relatively short adaptive filter in an echo canceler which cancels the electrical portion of the loop signal provided through the hybrid coupling path. The impulse response of the acoustic coupling path is typically much longer, however, requiring a very long or cascadable adaptive filter in an echo canceler for canceling the acoustic portion of the loop signal provided through the loudspeaker-to-microphone coupling path. In addition, because acoustic paths are sensitive to any motion, the impulse response can vary in time as the speakerphone user moves, the speakerphone is moved or the acoustic environment changes, all resulting in little or no enhancement. When applied to the acoustic coupling path, therefore, the echo canceling technique can be somewhat unreliable and expensive to implement.

SUMMARY OF THE INVENTION

In accordance with the present invention, an arrangement of an echo canceler-suppressor speakerphone effectively addresses the limitations of regeneration and reverberant return echo inherent in the design of speakerphones. In accordance with one aspect of the invention, the tendency for regeneration is eliminated by employing adaptive echo cancellation in the receive channel to cancel speakerphone talker echo across the hybrid and thereby reduce the local loop gain to below unity. With this arrangement, the receive channel remains open at all times. Receive speech is never interrupted irrespective of whether the speakerphone user is talking or not.

In accordance with another aspect of the invention, the generation of a reverberant return echo to the far-end party is avoided by employing adaptive echo suppression in the transmit channel. A variable gain element in the transmit channel is controlled solely by the receive signal level at a loudspeaker associated with the speakerphone. Thus transmit channel gain is reduced only when a receive signal is present at the loudspeaker and the gain reduction is applied only to the extent necessary to suppress the reverberant return echo to an acceptable level.

In accordance with yet another aspect of the invention, the speakerphone is virtually duplex from the idle mode. There is no initial clipping of transmit or receive speech when either the near-end or far-end party begins speaking, regardless of speech level. Moreover, since the receive channel remains open at all times, "double talking" is also achieved during normal operation of the arrangement.

Thus this arrangement of implementing the speakerphone functions avoids the limitations inherent in speakerphone design without introducing the undesirable effects of conventional voice-switched loss and without the unreliability and associated cost of a very long adaptive filter for use as an acoustic echo canceler.

BRIEF DESCRIPTION OF THE DRAWING

FIG. 2 is a block representation of the major functional components of an echo canceler-suppressor speakerphone operative in accordance with the principles of the invention;

Throughout the drawings, the same elements when shown in more than one figure are designated by the same reference numerals.

DETAILED DESCRIPTION

Figure 1:
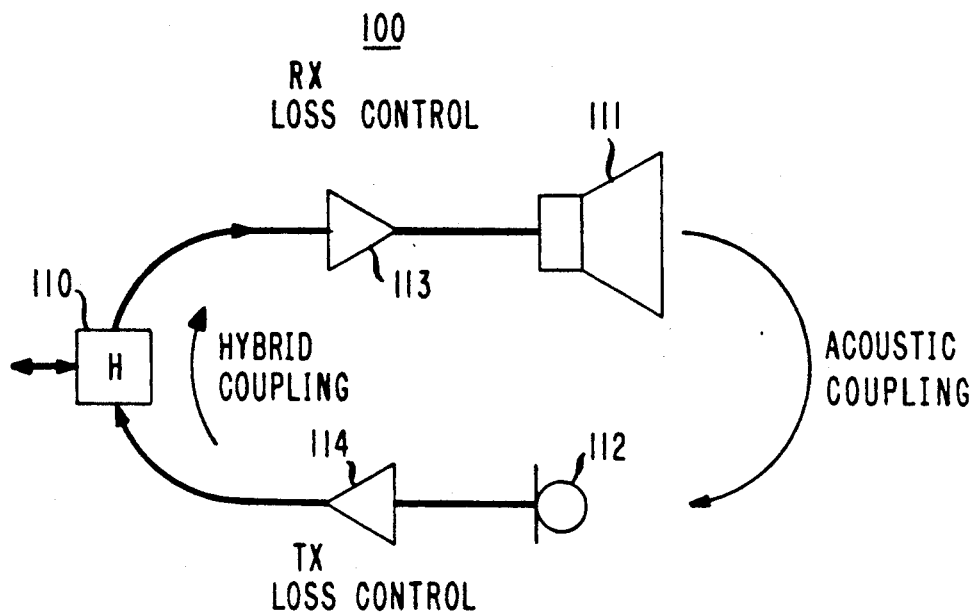
FIG. 1 depicts a general speakerphone circuit and two types of coupling that most affect its operation.

Referring now to FIG. 1, there is shown a general speakerphone circuit 100 to which the invention can be applied. This circuit illustrates the hybrid or electrical and acoustical coupling that most affect the operation of a speakerphone being employed in a telephone connection. A hybrid 110 connects transmit and receive channels of the speakerphone to a telephone line whose impedance may vary depending upon, for example, its length from a central office, as well as other hybrids in the connection. And the hybrid 110 only provides a best case approximation to a perfect impedance match to this line. A part of the signal in the transmit channel to the hybrid 110 thus returns over the receive channel as hybrid coupling or sidetone. With this limitation and the inevitable acoustic coupling between a loudspeaker 111 and a microphone 112, transmit and receive loss controls 113 and 114 are inserted in the appropriate channels to avoid regeneration or self oscillation.

Referring next to FIG. 2, there is shown in accordance with the invention an echo canceler-suppressor speakerphone including circuit components suitable for use in the general speakerphone circuit 100 of FIG. 1. As illustrated, the hybrid 110 is employed for connecting the speakerphone configured in a four-wire circuit configuration with a trip-ring line 201 to a central office. It is to be understood that if the speakerphone was implemented in a digital telephone environment, the hybrid 110 would not be required. Speech from a speakerphone user is picked up by the microphone 112 and coupled through the transmit channel via a microphone preamplifier 212, an echo suppression variolosser 214 and a transmit channel amplifier 213 to the hybrid 110. Transmit channel gain is provided by the microphone preamplifier 212 and the transmit channel amplifier 213. Speech from a far-end party is received by the hybrid 110 and coupled through the receive channel via a receive channel amplifier 222, an analog-to-digital converter 224, an echo canceler 225, a digital-to-analog converter 226, a volume control 300 and a power amplifier 223 to the loudspeaker 111. Receive channel gain is provided by the receive channel amplifier 222 and the power amplifier 223 along with the volume control 300.

After amplification by the receive channel amplifier 222, the speech from the far-end party is coupled to the analog-to-digital converter 224 where it is converted to a digital signal and provided to a first input to the echo canceler 225. This digital signal is also provided to a control unit 231. This control unit 231 provides control functions for the speakerphone, some of which are described in detail later herein. A digital signal processor having part number TMS 32010 is available from Texas Instrument and is suitable for use as control unit 231 with the appropriate coding.

After amplification by the transmit channel amplifier 213, a sample of the speech signal in the transmit channel is similarly coupled to an analog-to-digital converter 232 where it is converted to a digital signal and provided as a reference signal to a second input to the echo canceler 225. This sample of the speech signal in the transmit channel is also provided to the control unit 231. The control unit 231 compares the relative levels of the two signals provided by analog-to-digital converter 224 and analog-to-digital converter 232. If the signal from analog-to-digital converter 224 is higher than the signal from analog-to-digital converter 232, the control unit 231 assumes that speech is being received by the hybrid from a far-end party. If, on the other hand, the speech from analog-to-digital converter 232 is higher than the signal from analog-to-digital converter 224, the control unit 231 assumes that speech is being provided in the transmit channel by the near-end party. Certain other conditions are possible and are considered by the control unit 231 in combination with the relative levels of these two signals. These other possibilities are shown in the flow chart of FIG. 4 and also described later herein.

The sample of the speech signal in the transmit channel is used by the echo canceler 225 to generate a replica of the impulse response of the speech in the hybrid coupling path which is subtracted from the combination of the far-end speech plus the local echo provided by the hybrid 110 to yield only the far-end speech as the output from the echo canceler 225. In this manner, the transmit signal provided across the hybrid coupling path into the receive channel is canceled.

In the operation of the echo canceler 225 in greater detail, a replica of the echo signal is generated by passing as a reference input the sample of the speech signal from the transmit channel through an adaptive digital transversal filter in the canceler. Coefficients in the filter are updated based on minimizing the difference between the echo canceler output and the reference input. An echo canceler error signal continually provided to the control unit 231 by the echo canceler reflects this difference. This same error signal is used by the canceler in updating the coefficients in the filter.

The duration of the impulse response of the echo path determines the number of taps necessary in the filter. At an 8 KHz sampling rate, for example, 64 taps (8 milliseconds) are generally sufficient to cancel the echo. When the transfer function of the filter is adapted to be the same as that of the hybrid coupling path, complete cancellation of the echo is achieved with negligible measurable error. In that the canceler is not provided in advance with a transfer function of the hybrid coupling path, it continuously adapts the coefficients of the filter when adapting is permitted by the control unit 231. There are many echo cancelers presently available and suitable for use in implementing the canceler function required by the canceler 225. One such canceler is an AT&T 257BD cascadable echo canceler.

The limitation associated with the generation of a reverberant return echo to a far-end talker is addressed in the echo canceler-suppressor speakerphone by employing an adaptive variolosser 214 in the transmit channel. This variolosser 214 inserts a variable amount of loss in the transmit channel in response to the level of receive speech present at the loudspeaker 111. A sample of the signal provided to the loudspeaker 111 is rectified and filtered by a rectifier and filter section 233 to achieve a very fast (less than 1 millisecond) attack time and a release time consistent with typical room reverberation time and the burst nature of speech (approximately 150 milliseconds). The rectified and filtered signal is then converted to a logarithmic control signal by a logarithmic amplifier 234.

A threshold detector 235 receives the output of the logarithmic amplifier 234 and prevents low level signals at the loudspeaker 111 from causing a reduction in the transmit channel gain. Once the echo canceler 225 has adapted, such low level signals result in negligible far-end return echo and are therefore not coupled to the echo suppression variolosser 214 by the threshold detector 235. The threshold of threshold detector 235 is preset to a level dependent upon the acoustic coupling between the loudspeaker 111 and the microphone 112 in a particular environment.

In the absence of receive speech or when receive speech at the loudspeaker 111 is at a very low level, speech from the near-end party at the microphone 112 is amplified to a first level by the preamplier 212, passes through the echo suppression variolosser 214 unattenuated, amplified to a second level by the transmit channel amplifier 213 and then coupled to the tip-ring line by the hybrid 110. When the receive speech level at the loudspeaker 111 exceeds the threshold of the threshold detector 235, the transmit channel gain is reduced by the variolosser 214 in proportion to the signal level at the loudspeaker. Since both the transmit and receive channels are fully open in the absence of speech, no thresholds have to be overcome in either direction before full gain is achieved. This speakerphone is therefore at full duplex in the idle mode and clipping of initial syllables does not occur. Moreover, receive speech is never interrupted whether the near-end party is talking or not since during normal operation the receive channel remains fully open. This advantage is especially apparent during teleconferencing when more than one person is using the speakerphone and background conversations are occurring. In addition, in the presence of receive speech, only as much loss is inserted into the transmit channel as is necessary to reduce return echo to the far-end party to an acceptable level. The amount of loss inserted by the variolosser 214 is determined not by the local loop gain, therefore, but rather by the current receive speech level at the loudspeaker 111.

In the operation of the echo canceler-suppressor speakerphone, high volume control settings in conjunction with low level receive speech tend to produce echo canceler filter coefficient divergence. This filter coefficient divergence could possibly result in local loop regeneration. This instability is most likely to occur if these conditions are met before the echo canceler has been allowed to adapt to near-end generated speech in the transmit channel. By way of example, at high volume control settings, gain exists between the echo canceler receive channel input and the transmit channel reference input via the acoustic coupling path. During normal operation of the speakerphone, receive channel signals appearing at a level above the threshold in the threshold detector 235 are coupled to the echo suppression variolosser 214 which inserts sufficient loss to eliminate this gain. Receive channel signals below this threshold, however, are blocked by the threshold detector 235 and do not insert loss into the echo suppression variolosser 214. Hence, these low level signals are coupled from the receive channel into the transmit channel via the acoustic coupling path without a corresponding level of loss being inserted into the variolosser 214. If the gain provided by these low level signals is left uncompensated, the echo canceler 225 attempts to adapt to this receive speech in the transmit channel.

In order to prevent the echo canceler 225 from attempting to adapt to this speech, a reduction in the maximum level of the receive channel gain is provided. The basis for this reduction is determined by the control unit 231 which senses that the speakerphone might become unstable. This reduction is on the order of 10 dB less than the maximum gain that might otherwise be set by the user controlled volume control 300 and is implemented to prevent the possible occurrence of local loop regeneration. This is required if the echo canceler 225 has not yet adapted to the near-end generated speech in the transmit channel or is required to readapt as determined by control circuit 231.

Figure 3:
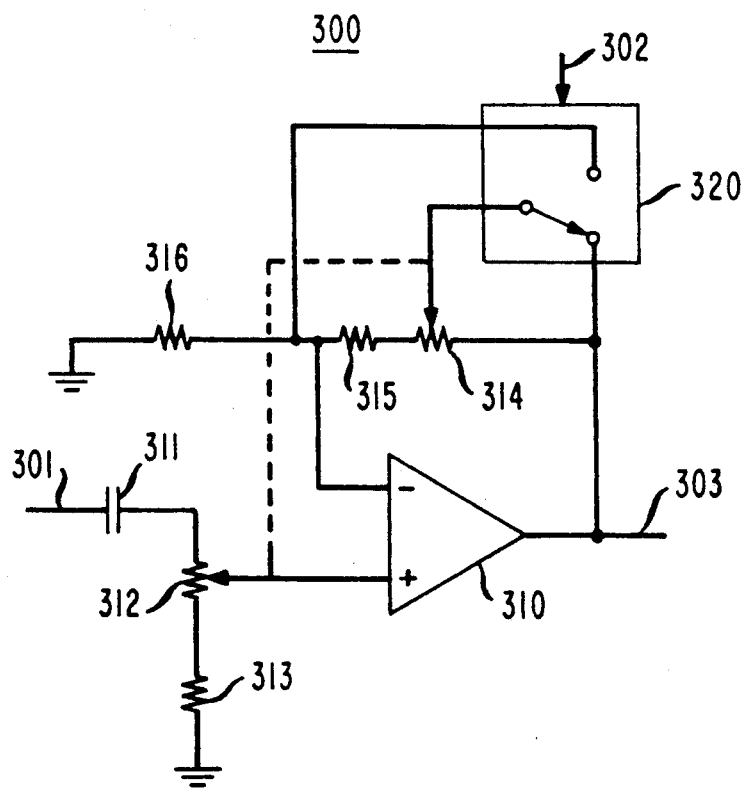
FIG. 3 is a schematic of an amplifier and control section therefor for limiting the gain of the amplifier, both being employed in this invention.

Referring next to FIG. 3, there is shown the schematic of an amplifier and control section suitable for use in volume control 300 for preventing local loop regeneration in the speakerphone. A received signal from the digital-to-analog converter 226 shown in FIG. 2 is provided over line 301 to the non-inverting input of an amplifier 310. This signal is coupled through capacitor 311 and serially arranged resistors comprising variable resistor 312 and resistor 313. Feedback resistance comprising serially arranged resistor 314 and resistor 315 along with reference resistor 316 are also included as circuitry associated with the amplifier 310. The output of amplifier 310 is coupled to the power amplifier 223, shown in FIG. 1 over line 303.

Variable resistors 312 and 314 are ganged together and comprise the user adjustable volume control. Bridged across variable resistor 314 is an analog switch which provides the functionality of a single pole, double throw switch 320, as shown. The position of this switch is determined by the control unit 231 which provides a volume control set and reset flag over line 302. The amplifier thus operates at two variable levels, a first level determined by the speakerphone user and a second level designed to maintain stability in the local loop of the speakerphone while the echo canceler 225 is adapting.

In response to the set flag, the speakerphone operates at the volume level set by the speakerphone user. Responsive to the reset flag, the switch 320 reduces to a reduced variable level the maximum gain from the amplifier 310 by limiting the maximum level of feedback resistance insertable by the speakerphone user across the amplifier 310. Amplification in this type of amplifier is such that the greater the feedback resistance, the greater the amplification from the amplifier.

In order to maintain stability in the operation of the speakerphone, the volume control 300 limits the maximum level to which signals in the receive channel may be amplified before the echo canceler 225 has had a chance to adapt. After stabilization and during normal operation, the speakerphone user may select the normal operating range of volume control levels. Since the upper end of this range is much greater than is permitted during adapting by the echo canceler, operation in this range is prohibited by the control unit 231 until after the echo canceler 225 has adapted.

An explanation as to how this arrangement provides for a variable volume control at both a high level volume range and a reduced volume level range is provided. During normal operation in the high level volume level range (set flag activated), as the tap on variable resistor 312 is moved toward the capacitor 311 and the tap on variable resistor 314 is moved toward the output of the amplifier 310, the gain at the output terminal of amplifier 310 accordingly increases to its maximum possible level. During operation in the reduced volume level range (reset flag activated), moving the tap on variable resistor 312 towards the capacitor 311 still causes an increase in the output voltage of the amplifier 310. As the tap on variable resistor 314 moves toward the output terminal of the amplifier 310, however, the gain at the output of amplifier 310 due to this variable resistor is decreased accordingly since in this operating configuration the feedback resistance decreases as the volume control is increased. The net effect is that the output of the volume control unit 300 increases somewhat, but at a greatly reduced level from that available during operation in the high volume level range.

If during normal operations, the control unit 231 detects that the speakerphone might become unstable, the control unit requires the echo canceler to readapt to the transmit speech. For this condition, and with reference again to FIG. 2, the control unit 231 provides the reset flag to the switch 320 reducing the gain available in the receive channel from the volume control 300. The control unit 231 determines when to have the echo canceler 225 readapt to transmit speech by monitoring the signal level at the output of transmit channel amplifier 213, provided by digital-to-analog converter 232, also the signal level presented to the echo canceler 225 by the analog-to-digital converter 224, and also the echo canceler error signal provided by the echo canceler 225. The conditions that in combination cause the echo canceler 225 to readapt are: when the output of the transmit channel amplifier 213 exceeds a certain threshold; when the relative level of the signal presented to the echo canceler 225 by the analog-to-digital converter 224 is less than the signal at the output of the transmit channel amplifier 213; and when the difference between the level of the output of the transmit channel amplifier and the echo canceler error signal is less than a certain threshold. The control unit 231, detecting the presence of these conditions for a predefined period, assumes that an unstable state exists and thus requires the echo canceler 225 to readapt to a signal in the transmit channel from the near-end location.

For most normal mid-range operating volume levels, no appreciable change in the gain of the amplifier 310 to prevent self oscillation is necessary. And no change is necessary at the low-range operating volume levels. During operation of the speakerphone at these levels, the perceived level of receive speech provided to a near-end user while the echo canceler is adapting and after it has adapted is the same. The volume level change is apparent only when the user has the volume control set at the upper end of of its normal operating range.

Figure 4:
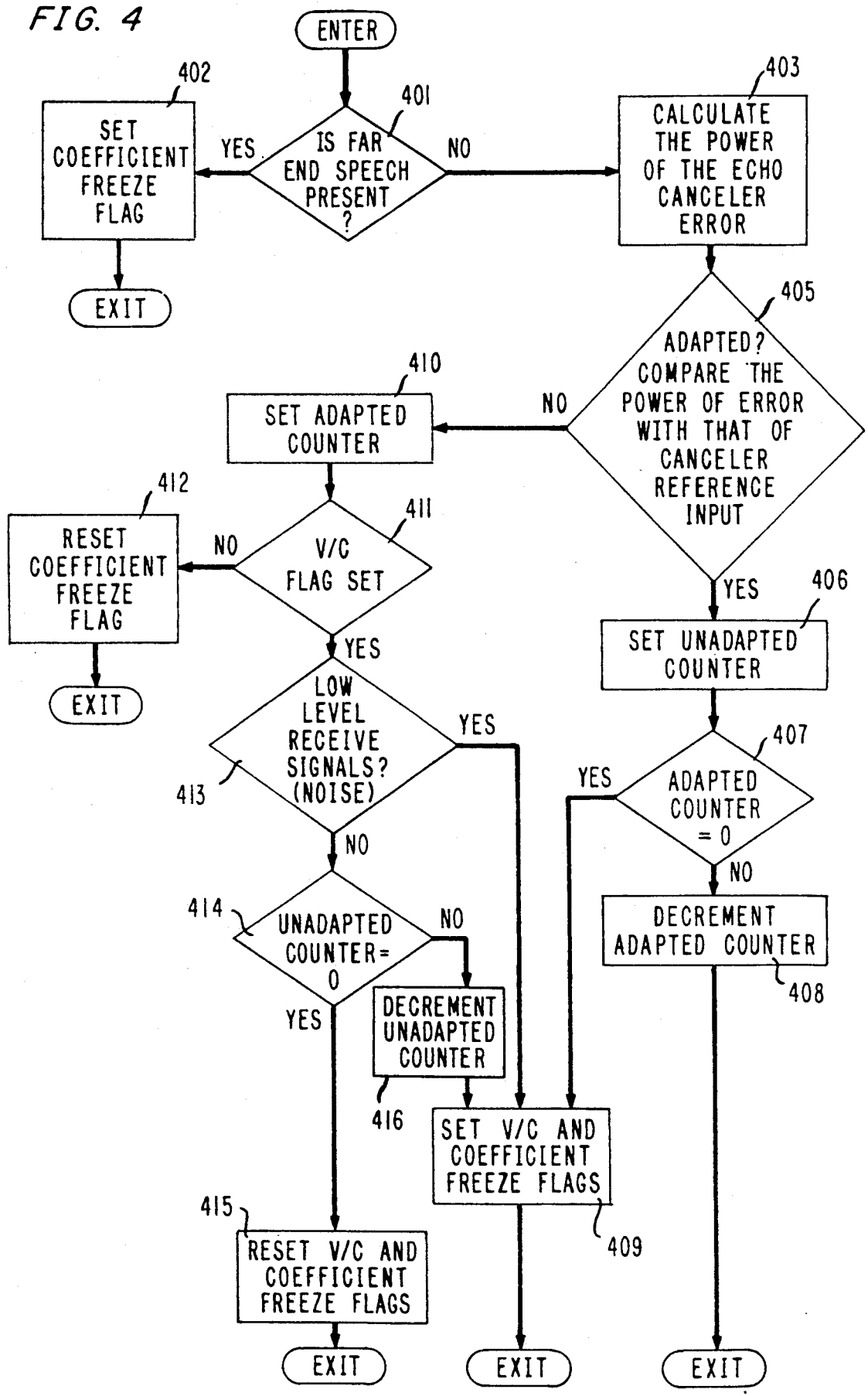
FIG. 4 depicts a flow chart illustrating the operation of the speakerphone of FIG. 1.

Referring now to FIG. 4, there is shown a flow chart illustrating a processing task performed by the circuitry of FIGS. 2 and 3. This processing operation will be more easily understood if the circuitry of FIGS. 2 and 3 are both referenced in combination with this flow chart. The processing task is advantageously determined by a process or program stored in control unit 231. The processing task is one of many performed by the control unit 231 and is therefore entered once each 125 microseconds.

The processing task is entered at decision 401 where it determines if far-end speech is present. If far-end speech is present, the process advances to step 402 where the coefficient freeze flag to the echo canceler 225 is set and then the processing task is exited. In this step 402, the speakerphone is prevented from adapting whenever far-end speech is present. This is achieved by freezing the coefficients in the echo canceler in their existing positions. If at step 401, far-end speech is not present then the process is allowed to advance to step 403. At step 403, the process calculates the power or magnitude of the echo canceler error and then advances to decision 405. At this decision 405, the process determines if the echo canceler has adapted by comparing the error calculated in step 403 with that of the canceler reference input. If the echo canceler has adapted, the process next advances to step 406 where an unadapted counter is set.

The unadapted counter along with an adapted counter are both used in the processing task for providing control functions for the speakerphone. In operation, the unadapted counter is preset to a given count once the process indicates that the speakerphone is adapted as in decision 405. To guard against a few samples causing the echo canceler to prematurely readapt, multiple samples reflective of such need are required before the echo canceler is configured permitting it to adapt. In one illustrated embodiment, the unadapted counter is preset to a count of 1,024. In this embodiment, therefore, 1,024 samples indicating that the speakerphone is unadapted must be provided before the unadapted counter is decremented to zero. Since a sample may be provided each time the processing task is performed (every 125 microseconds), the minimum time required to decrement the unadapted counter to zero is 0.128 seconds.

To similarly guard against a few samples from the echo canceler prematurely indicating that it has adapted, multiple samples reflective of such need are also required before it is considered to have adapted. In the illustrated embodiment, the adapted counter is set at a count of 8,192. Thus 8,192 samples indicating that the speakerphone is adapted must be provided before the adapted counter is decremented to zero. Since a sample may be provided each time the processing task is performed, the minimum time required to decrement the adapted counter to zero is 1,024 seconds.

After the processing step 406, the process next advances to decision 407 where it is determined if the adapted counter is set at zero. If set to zero, the process advances to step 409 where the volume control set flag is activated and the coefficient freeze flag is set. The processing task is then exited. If the adapted counter is not set to zero the process advances to step 408 where the adapted counter is decremented and then the processing task is exited.

Referring once again to decision 405, if the echo canceler is not adapted, the process advances to step 410 where the adapted counter is set. From this step, the process advances to decision 411 where a determination is made as to whether the volume control set flag is activated. If the volume control set flag is not activated, the process advances to step 412 where the coefficient freeze flag is reset and then the processing task is exited. Resetting the coefficient freeze flag unfreezes the coefficients in the echo canceler 225 and permits it to adapt as is possible when near-end generated sounds are present. If the volume control flag is activated at step 411, however, the process then advances to decision 413 where a determination is made as to whether low level receive signals are present. If low level receive signals are present, the process advances to step 409 where the volume control set flag is activated and the coefficient freeze flag is set and the processing task then exited. If low level receive signals are not present at step 413, the process advances to decision 414 where it is determined if the unadapted counter has decremented to zero. If the unadapted counter is not set at zero, the process advances to step 416 where the unadapted counter is decremented. The processing task next advances to step 409 where the volume control set flag is activated and the coefficient freeze flag is set. If in step 414 the unadapted counter is set at zero, however, the processing task advances to step 415 where the volume control reset flag is activated permitting operation at the reduced maximum volume levels set by the control unit 231 and the coefficient freeze flag is reset enabling the coefficients in the canceler 225 to readapt as appropriate to near-end generated sounds in the transmit channel. The processing task is then exited.

Although a specific embodiment of the invention has been shown and described, it will be understood that it is but illustrative and that various modifications may be made therein without departing from the spirit and scope of the invention as defined in the appended claims. An example of such a modification is a speakerphone employing a single digital signal processor which is capable of implementing both the echo cancellation function and the control logic function. It is to be understood, therefore, that within the scope of the appended claims the invention may be practiced otherwise than as specifically described.

What is claimed is:

1. An apparatus for processing speech signals for a communication line, the apparatus including a transmit signal path for transmitting speech signals to the communication line and a receive signal path for receiving speech signals from the communication line, the apparatus comprising:

loss insertion means in the transmit signal path for attenuating the speech signals for transmission over the communication line;

echo canceling means in the receive signal path for canceling transmit speech signals appearing in the receive signal path;

receive speech level adjusting means for controlling the level of the speech signals in the receive signal path;

means for measuring an estimate of both the level of speech signals received from the communication line and the level of transmit speech signals appearing in the receive signal path; and loss adjusting means operably responsive to the measuring means for proportionally adjusting the level of attenuation inserted by the loss insertion means into the transmit path in response to the estimate of the level of the speech signals received from the communication line, and the receive speech level adjusting means being operably responsive to both the echo canceling means and the measuring means for inserting attenuation into the receive signal path in response to uncanceled transmit speech signals appearing in the receive signal path.

2. The apparatus for processing speech signals as in claim 1 wherein the loss adjusting means includes a predetermined threshold coupling level and comparison means for comparing the speech signal received from the communication line with the threshold coupling level, the loss adjusting means being operable for adjusting the level of attenuation inserted by the loss insertion means into the transmit path when the level of the received speech signal exceeds that of the threshold coupling level.

3. The apparatus for processing speech signals as in claim 1 further including means for measuring the level of the transmit speech signals provided by the apparatus to the communication line for transmission thereover.

4. The apparatus for processing speech signals as in claim 3 wherein the receive speech level adjusting means is operable both in a first condition and in a second condition, operation of the receive speech level adjusting means in the first condition providing a first range of available signal levels and in the second condition providing a second reduced range of available signal levels.

5. The apparatus for processing speech signals as in claim 4 further comprising control means for controlling the receive speech level adjusting means, the control means configuring the receive speech level adjusting means for operation in either the first condition or the second condition.

6. The apparatus for processing speech signals as in claim 5 wherein the echo canceling means requires a period of time to adapt for canceling the transmit speech signals appearing in the receive signal path, the echo canceling means providing an error adapting signal to the control means, responsive to this error adapting signal and to receipt of select relative signal levels from the transmit speech level measuring means and the receive speech level measuring means, the control means determining the level of adaption by the echo canceling means to the transmit speech signals, the control means configuring the receive speech level adjusting means for operation in the first condition when the echo canceling means is adapted to the transmit speech and configuring the receive speech level adjusting means for operation in the second condition during the time period when the echo canceling means is not adapted to the transmit speech.

7. A method of processing speech signals in a voice signal controller, the voice signal controller being connectable to a communication line and including a transmit signal path for transmitting speech signals to the communication line and a receive signal path for receiving speech signals from the communication line, the method comprising the steps of:

inserting loss in the transmit signal path for attenuating the speech signals for transmission over the communication line;

inserting a time variant signal in the receive signal path for canceling transmit speech signals appearing in the receive signal path;

measuring an estimate of both the level of speech signals received from the communication line and the level of transmit speech signals appearing in the receive signal path; and adjusting the level of attenuation inserted by the loss insertion step into the transmit path responsive to the receive speech signals measuring step, and inserting attenuation into the receive signal path in response to uncanceled transmit speech signals appearing in the receive signal path.

8. The method of processing speech signals in a voice signal controller as in claim 7 wherein the level adjusting step includes the steps of measuring a predetermined threshold coupling level and comparing the speech signal received from the communication line with the threshold coupling level, the level adjusting step being operable for adjusting the level of attenuation inserted by the loss inserting step in the transmit path when the level of the received speech signal exceeds that of the threshold coupling level.

9. The method of processing speech signals in a voice signal controller as in claim 7 further including the step of measuring the level of the transmit speech signals provided to the communication line for transmission thereover.

10. The method of processing speech signals in a voice signal controller as in claim 9 wherein the receive speech level adjusting step is operable both in a first condition and in a second condition, operation of the receive speech level adjusting step in the first condition providing a first range of available signal levels and in the second condition providing a second reduced range of available signal levels.

11. The method of processing speech signals in a voice signal controller as in claim 10 further including the step of controlling the receive speech level adjusting step, the controlling step configuring the receive speech level adjusting step for operation in either the first condition or the second condition.

12. The method of processing speech signals in a voice signal controller as in claim 11 wherein the time variant signal inserting step requires a period of time to adapt to the transmit speech signals appearing in the receive signal path for canceling these transmit speech signals, the time variant signal inserting step providing an error adapting signal to the controlling step, responsive to this error adapting signal and to receipt of select relative signal levels provided by the transmit speech level measuring step and the receive speech level measuring step, the controlling step determining the level of adaption by the time variant signal inserting step to the transmit speech signals, the controlling step configuring the receive speech level adjusting step for operation in the first condition when the time variant signal inserting step is adapted to the transmit speech and configuring the receive speech level adjusting step for operation in the second condition during the time period when the time variant signal inserting step is not adapted to the transmit speech.

13. The method of processing speech signals in a voice signal controller as in claim 12 wherein the time variant signal inserting step is provided by an echo canceler.

* * * * *